Patented Oct. 24, 1950

2,527,292

UNITED STATES PATENT OFFICE 2,527,292

BETA-NITROALKYL AMINES AND METHODS OF PRODUCTION OF SAME

Carl T. Bahner, Jefferson City, Tenn.

No Drawing. Application May 1, 1947,
Serial No. 745,233

10 Claims. (Cl. 260—584)

This invention relates to (beta-nitroalkyl)-amines and methods for their production. More particularly, it relates to compounds of the formula $$\text{alkyl}-\underset{\underset{NO_2}{|}}{CH}-\underset{\underset{\text{alkyl}}{|}}{CH}-\overset{\overset{R^3}{|}}{N}-R^4$$

wherein $R^3$ represents a substituent selected from a class consisting of hydrogen and alkyl, and $R^4$ represents a substituent selected from a class consisting of hydrogen, alkyl and hydroxalkyl, while $R^3$ and $R^4$ together may represent pentamethylene.

Among the novel products of my invention may be cited the following: 2-amino-3-nitrohexane, 3-amino-4-nitroheptane, N-(4-nitro-3-heptane)-2-amino-1-ethanol, N - (4-nitro-3-heptane) butylamine, and N-(4-nitro-3-hexane) diethylamine.

The products of my invention are obtained from the reaction in about equimolecular proportions of ammonia and amines having the general formula $$R^3-NH-R^4$$

in which $R^3$ and $R^4$ have their former significances, with nitroalkenes having the formula:

$$\text{alkyl}-\underset{\underset{NO_2}{|}}{C}=CH-\text{alkyl}$$

My invention further relates to the novel products of the foregoing reactions.

Among the nitroalkenes suitable for use in my process may be mentioned the following: 3-nitro-3-hexene, 3-nitro-4-heptene, 2-nitro-2-butene, 2-nitro-2-pentene, 2-methyl-3-nitro-3-pentene and 2-nitro-4-methyl-2-pentene.

Among the amine compounds suitable for use in my process may be mentioned: ammonia, methylamine, dimethylamine, ethylamine, diethylamine, 2-hydroxy-ethylamine, bis(2-hydroxyethyl) amine, isopropylamine, n-butylamine, n-hexylamine, di-n-butylamine and piperidine.

In the past, a very limited group of (nitroalkyl)-amines have been prepared by indirect means, such as by first reacting an alkyl or aryl amine with formaldehyde, and then reacting the resulting product with a nitroparaffin. I have now discovered that (beta-nitroalkyl) amines may be obtained directly by the reaction of nitroalkenes of the type disclosed above with ammonia, akylamines, hydroxyalkylamines, and saturated cyclic amines.

In carrying out the reaction between nitroalkenes and amines, I prefer first to introduce the amine into a suitable reaction vessel equipped with an efficient stirring device and with means for heating and cooling the contents thereof. The amine may be dissolved in an inert or unreactive solvent, such as an alcohol, an ether, or a cyclic ether, to help in maintaining the mobility of the reaction mixture and to assist in heat transfer. The nitroalkene, either alone or similarly dissolved, is then added gradually with sufficient stirring, and the contents of the reaction vessel are meanwhile preferably maintained at or below room temperature. The reaction is generally quite rapid, so that the process can ordinarily be completed within 15 to 30 minutes, if the cooling means is capable of holding the temperature at the desired level. The specified temperature range is preferable, since at higher temperature nitroalkenes tend to polymerize and, of course, the reaction mixture should be maintained at temperatures below those at which the nitroalkene tends to polymerize. But it will be apparent that my process is operative to some extent at temperatures substantially above room temperature. Temperatures below 50° C. are the most practical. After the reaction is completed, the solvent is removed by evaporation or distillation, and the product may be isolated in a number of ways, such as by crystallization or distillation, or by preparation and crystallization of the hydrochloride.

In carrying out the reaction between ammonia and nitroalkenes, an aqueous solution of ammonia may be used; however, I prefer to charge ammonia gas into a solution of the nitroalkene in ether or other suitable inert solvent.

The following specific examples will further illustrate my invention:

*Example I*

Ammonia reacted with 3-nitro-3-hexene to produce 3-amino-4-nitrohexane:

$$C_2H_5-\underset{\underset{NH_2}{|}}{CH}-\underset{\underset{NO_2}{|}}{CH}-C_2H_5$$

Ammonia gas was passed into a solution of 24 parts of 3-nitro-3-hexene in 100 parts of absolute ethanol at 25–35° C. during a period of 25 minutes, adding only a small amount of ammonia at a time. Heat was evolved by the reaction. After the mixture had stood an hour the lachrymatory odor had disappeared completely. The alcohol and excess ammonia were removed by evaporation under a pressure of 4 mm. The product had a definite amine odor. It was converted to the amine hydrochloride by dissolving in ethyl ether and passing in dry hydrogen chloride gas. The precipitate was recrystallized from butanol solution at room temperature by adding isopropyl ether. White crystals were analyzed by the Mohr method. Analysis: Cl, 19.71%; calculated for $C_6H_{15}N_2O_2Cl$; Cl, 19.42%.

*Example II*

The preparation of 4-amino-3-nitroheptane was accomplished in a similar manner as the reaction above by treating 3-nitro-3-heptene in ammonia in absolute ethanol at room temperature and then evaporating the alcohol. The structural formula for this compound is

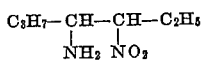

*Example III*

3-nitro-3-heptene reacted with 2-amino-1-ethanol to yield N-(3-nitro-4-heptane)-2-amino-1-ethanol:

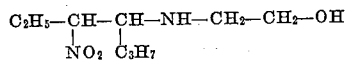

This compound was prepared by adding 143 parts of 3-nitro-3-heptene to 61 parts of 2-amino-1-ethanol in small portions during a period of about 10 minutes, keeping the temperature at 25–35° C. by use of a cold water bath. The temperature rise following the addition of each portion of nitroolefin indicated that most of the nitroolefin reacted within 2 or 3 minutes after mixing. The reaction was practically completed in 15 minutes after all of the 3-nitro-3-heptene had been added.

*Example IV*

N-(3-nitro-4-heptane)butylamine

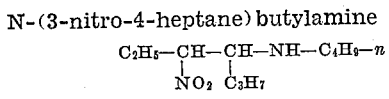

was prepared by adding 716 parts of 3-nitro-3-heptene to 366 parts of n-butylamine, in small portions, with stirring and external cooling, at a temperature of 30–40° C.

*Example V*

N-(3-nitro-4-hexane)diethylamine

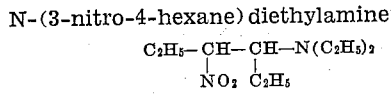

was prepared by adding 0.360 part of diethylamine (0.005 mole) to 0.821 part of 3-nitro-3-hexene (0.0064 mole), keeping the temperature from rising above 50° C. by using a cold water bath. Evolution of the heat indicated that most of the reaction occurred within about 3 minutes after mixing, although the reaction continued for several minutes.

*Example VI*

N-(1-ethyl-2-nitrobutyl)piperidine was prepared by adding 129 parts of 3-nitro-3-hexene (1 mole) to 85 parts of piperidine (1 mole) in small portions during a period of about 15 minutes keeping the temperature at 25–35° C. by use of a cold water bath. The reaction was practically completed within 15 minutes after all of the nitroolefin had been added. The formula of this new compound is:

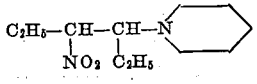

While the above examples illustrate the preferred embodiments of my invention, it will be understood that departures may be made therefrom within the scope of the description and claims. In general, it may be said that any modifications or equivalents that would ordinarily occur to those skilled in the art are to be considered as lying within the scope of my invention.

It will be noted that in Example I the ammonia was used in excess of molecular proportions while in Example V the nitroalkene was in excess. But in both cases the reactants actually reacted in equimolecular proportions.

The (beta-nitroalkyl)amines of my invention are useful in numerous fields. Thus, for example, (beta-nitroalkyl)amines containing lower alkyl groups may be used as intermediates in the manufacture of Diesel oil additives. Reduction of the nitro group to an amino group yields compounds which are of value in the preparation of detergents. Tertiary alkylamines can be converted to quaternary ammonium salts which are valuable as germicides. Numerous other uses for such compounds will readily occur to those skilled in the art.

In accordance with the foregoing specification, I claim as my invention:

1. Beta-nitroalkyl amines having the general formula:

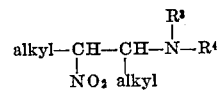

wherein $R^3$ represents a substituent selected from a class consisting of hydrogen and alkyl, and $R^4$ represents a substituent selected from a class consisting of hydrogen, alkyl and hydroxyalkyl, while $R^3$ and $R^4$ together may represent pentamethylene.

2. 3-amino-4-nitrohexane.

3. 4-amino-3-nitroheptane.

4. N-(3-nitro-4-heptane)-2-amino-1-ethanol.

5. A process for producing (beta-nitroalkyl) amines which comprises reacting in substantially equimolecular proportions a nitroalkene having the formula

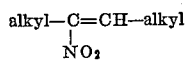

with an amine compound having the formula

wherein $R^3$ represents a substituent selected from a class consisting of hydrogen and alkyl, and $R^4$ represents a substituent selected from a class consisting of hydrogen, alkyl and hydroxyalkyl, while $R^3$ and $R^4$ together may represent pentamethylene, the reaction mixture being maintained at temperatures not substantially exceeding 50° C. until the reaction is completed, and recovering the resulting (beta-nitroalkyl) amine.

6. The process of claim 5 wherein the reaction is conducted in the presence of an inert solvent.

7. A process for producing (beta-nitroalkyl) amines which comprises reacting in substantially equimolecular proportions ammonia with a nitroalkene having the formula

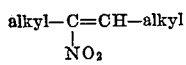

while agitating and cooling to keep the reaction mixture at temperatures not substantially exceeding 50° C., and recovering the resulting (beta-nitroalkyl) amine.

8. A process for producing 3-amino-4-nitrohexane which comprises agitating a solution of 3-nitro-3-heptene in an inert solvent, passing ammonia into said solution, maintaining the mixture at temperatures not substantially exceeding 50° C. and separating the resulting 3-amino-4-nitrohexane therefrom, the ammonia and the nitroheptene being reacted in substantially equimolecular proportions.

9. A process for producing 4-amino-3-nitroheptane which comprises adding 3-nitro-3-heptene to an inert solvent and passing therein ammonia, with stirring and cooling to maintain the reaction mixture at temperatures not substantially exceeding 50° C., and separating the resulting 4-amino-3-nitroheptane, the ammonia and nitroheptene being reacted in substantially equimolecular proportions.

10. A process for producing N-(3-nitro-4-heptane)-2-amino-1-ethanol which comprises adding 3-nitro-3-heptene to 2-amino-1-ethanol, with stirring and cooling to maintain the reaction mixture at temperatures not substantially exceeding 50° C., and separating the resulting N-(3-nitro-4-heptane)-2-amino-1-ethanol, the 2-amino-1-ethanol and the nitroheptene being reacted in substantially equimolecular proportions.

CARL T. BAHNER.

REFERENCES CITED

The following references are of record in the file of this patent:

UNITED STATES PATENTS

| Number | Name | Date |
| --- | --- | --- |
| 2,292,212 | Dickey et al. | Aug. 4, 1942 |
| 2,381,408 | Senkus | Aug. 7, 1945 |
| 2,419,506 | Senkus | Aug. 22, 1947 |

OTHER REFERENCES

De Mauny, "Bull. Soc. Chim." (5), vol. 4, pages 1451–1460 (1937).

Senkus, "J. Am. Chem. Soc.," vol. 68, pages 10–12 (Jan. 1946).

Johnson "J. Am. Chem. Soc.," vol. 68, pages 12–14 (Jan. 1946).

Certificate of Correction

Patent No. 2,527,292                                         October 24, 1950

CARL T. BAHNER

It is hereby certified that error appears in the printed specification of the above numbered patent requiring correction as follows:

Column 1, line 12, for "hydroxalkyl" read *hydroxyalkyl*; column 2, lines 19 and 20, for the word "temperature" read *temperatures*; line 26, before "50° C." insert *about*; column 6, line 15, list of references cited, for "Aug. 22, 1947" read *Apr. 22, 1947*;

and that the said Letters Patent should be read as corrected above, so that the same may conform to the record of the case in the Patent Office.

Signed and sealed this 9th day of January, A. D. 1951.

[SEAL]

THOMAS F. MURPHY,
*Assistant Commissioner of Patents.*